March 21, 1961 E. A. HARTBAUER Re. 24,951

TUCKING MECHANISM FOR PACKAGING MACHINE

Original Filed Aug. 27, 1957 9 Sheets-Sheet 1

INVENTOR:
ELLSWORTH A. HARTBAUER
BY Merrell, Johnston, Cobb & Root
ATT'YS

TUCKING MECHANISM FOR PACKAGING MACHINE

Original Filed Aug. 27, 1957 9 Sheets-Sheet 2

INVENTOR:
ELLSWORTH A. HARTBAUER
BY Merrell, Johnston, Cobb + Root
ATT'YS

TUCKING MECHANISM FOR PACKAGING MACHINE
Original Filed Aug. 27, 1957 9 Sheets-Sheet 3
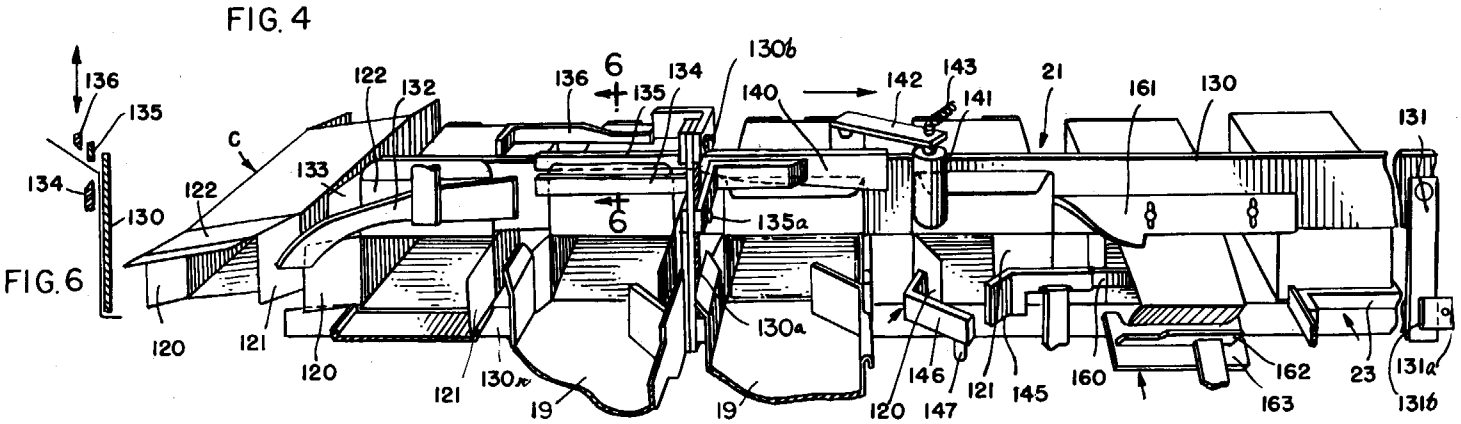
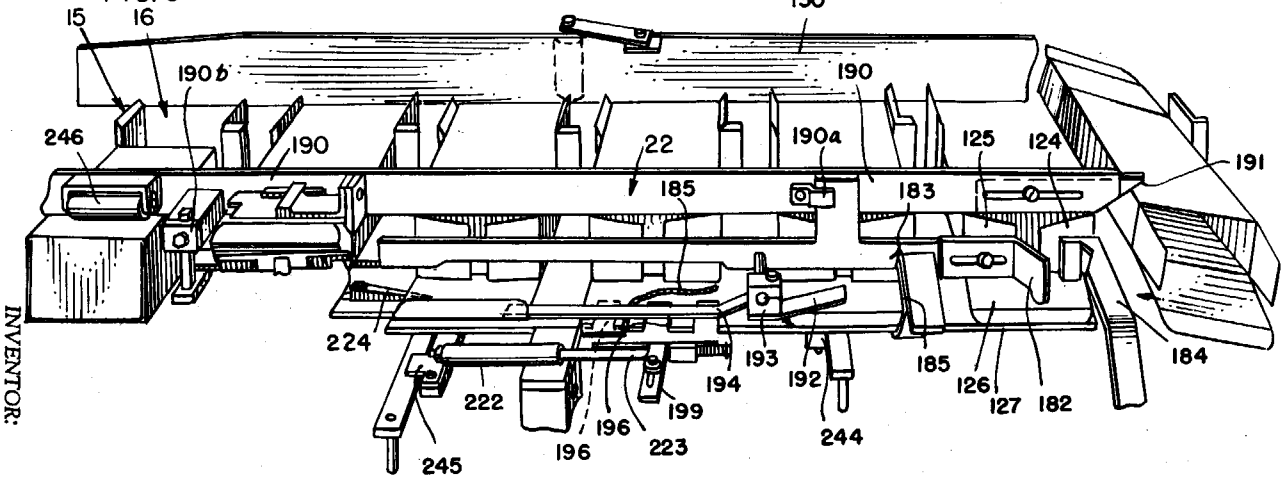
FIG. 5
INVENTOR:
ELLSWORTH A. HARTBAUER
BY Marshall, Johnston, Cooke & Root
ATT'YS

TUCKING MECHANISM FOR PACKAGING MACHINE

Original Filed Aug. 27, 1957 9 Sheets-Sheet 4

INVENTOR:
ELLSWORTH A. HARTBAUER
BY Marzall, Johnston, Cook & Root
ATT'YS

TUCKING MECHANISM FOR PACKAGING MACHINE

Original Filed Aug. 27, 1957 9 Sheets-Sheet 5

INVENTOR:
ELLSWORTH A. HARTBAUER
BY Merrill, Johnston, Cobb & Root
ATT'YS

TUCKING MECHANISM FOR PACKAGING MACHINE

Original Filed Aug. 27, 1957 9 Sheets-Sheet 6

INVENTOR:
ELLSWORTH A. HARTBAUER
BY Marcell, Johnston, Cobb & Root
ATT'YS

TUCKING MECHANISM FOR PACKAGING MACHINE

Original Filed Aug. 27, 1957 9 Sheets-Sheet 7

INVENTOR:
ELLSWORTH A. HARTBAUER
BY Marzall, Johnston, Cooke & Root
ATT'YS

TUCKING MECHANISM FOR PACKAGING MACHINE

Original Filed Aug. 27, 1957 9 Sheets-Sheet 8

INVENTOR:
ELLSWORTH A. HARTBAUER
BY Marvell, Johnston, Cole & Root
ATT'YS

TUCKING MECHANISM FOR PACKAGING MACHINE

Original Filed Aug. 27, 1957 9 Sheets-Sheet 9

INVENTOR:
ELLSWORTH A. HARTBAUER
BY Marzall, Johnston, Cobb & Root
ATT'YS

United States Patent Office

Re. 24,951
Reissued Mar. 21, 1961

24,951

TUCKING MECHANISM FOR PACKAGING MACHINE

Ellsworth A. Hartbauer, Concord, Calif., assignor to F. B. Redington Co., Bellwood Village, Ill., a corporation of Delaware Original No. 2,900,778, dated Aug. 25, 1959, Ser. No. 680,546, Aug. 27, 1957. Application for reissue June 30, 1960, Ser. No. 40,496

6 Claims. (Cl. 53—376)

Matter enclosed in heavy brackets [ ] appears in the original patent but forms no part of this reissue specification; matter printed in italics indicates the additions made by reissue.

This invention relates generally to a packaging machine, and more particularly to a flap tucking and closing mechanism for tucking and closing the end panels and tuck flaps of a carton.

The tucking mechanism of this invention is arranged to operate on opposite sides of an intermittently driven conveyer to tuck and close the opposite end panels and tuck flaps of a carton. Each tucking and closing assembly includes a tuck flap breaker and creasing roller arranged to condition the tuck flap for closing of the end panel, as well as various plows or cams for plowing or camming the tuck flaps and end panels into various positions. After the tuck flap has been conditioned by folding over along the score line between the tuck flap and the end panel, a tucker bar and tuck flap aligning plate at each side of the conveyer operates to close the end panels and tuck the tuck flap between the top and bottom walls of the carton and the corresponding side flaps. The tucking and closing mechanisms are particularly adapted to handle various sizes of cartons and are arranged to begin the tucking and folding operations as the conveyer moves the cartons through their loading positions thereby providing a packaging machine shorter in size and more compactly constructed. Although the tucking mechanism on this machine is generally adapted for use with reverse tuck cartons, it may easily be adapted for use with straight tuck cartons.

Accordingly, it is an object of this invention to provide a packaging machine having an improved tucking mechanism adapted to accommodate cartons of various sizes and to be arranged to enhance the compactness of the machine and shorten the machine thereby permitting the machine to be accommodated in a smaller floor area.

Another object of this invention resides in a tucking mechanism for use on a packaging machine, wherein the tucking mechanism is arranged to provide some of the tucking and closing operations during the loading of the cartons.

Still another object of this invention is in the provision of tucking and closing assemblies for tucking and closing the front and rear end panels and tuck flaps of a carton as it is advanced by a conveyer along a packaging machine.

A further object of this invention resides in the provision of a tucking mechanism arranged to be adjustable so as to handle various sizes of cartons in a packaging machine.

A still further object of this invention is in the provision of a tucking mechanism whereby a tuck flap is broken over the end panel while the conveyer is at rest thereby eliminating the normal problem of friction.

Other objects, features, and advantages of the invention will be apparent from the following detailed disclosure, taken in conjunction with the accompanying sheets of drawings, wherein like reference numerals refer to like parts, in which:

Fig. 4 is a front perspective view of the front tucking and closing assembly for closing the front end of the carton;

Fig. 5 is a perspective view of the rear tucking and closing assembly for closing the rear of the carton;

Fig. 6 is an enlarged sectional view taken substantially along line 6—6 of Fig. 4;

The embodiment of the present invention is arranged to handle reverse tuck cartons, although it will be appreciated that straight tuck or glued end cartons may be accommodated by the machine of the present invention be merely providing the proper type of tucking and closing assemblies.

Figures 1, 2:
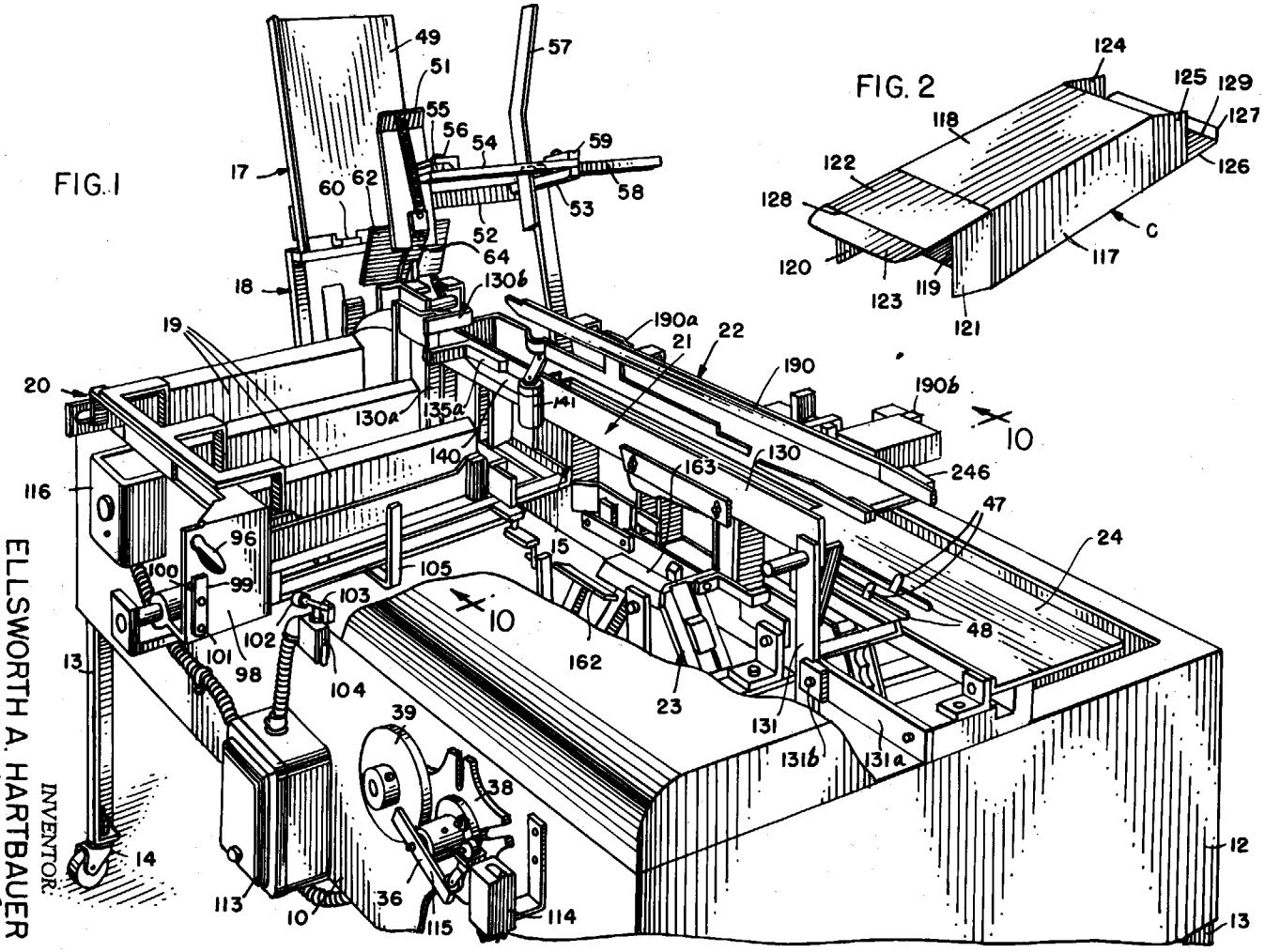
Fig. 1 is a front perspective view of a packaging machine embodying the invention, with some parts broken away for purposes of clarity.
Fig. 2 is a perspective view of a sample carton suitable for use with the present invention.
Figure 3:
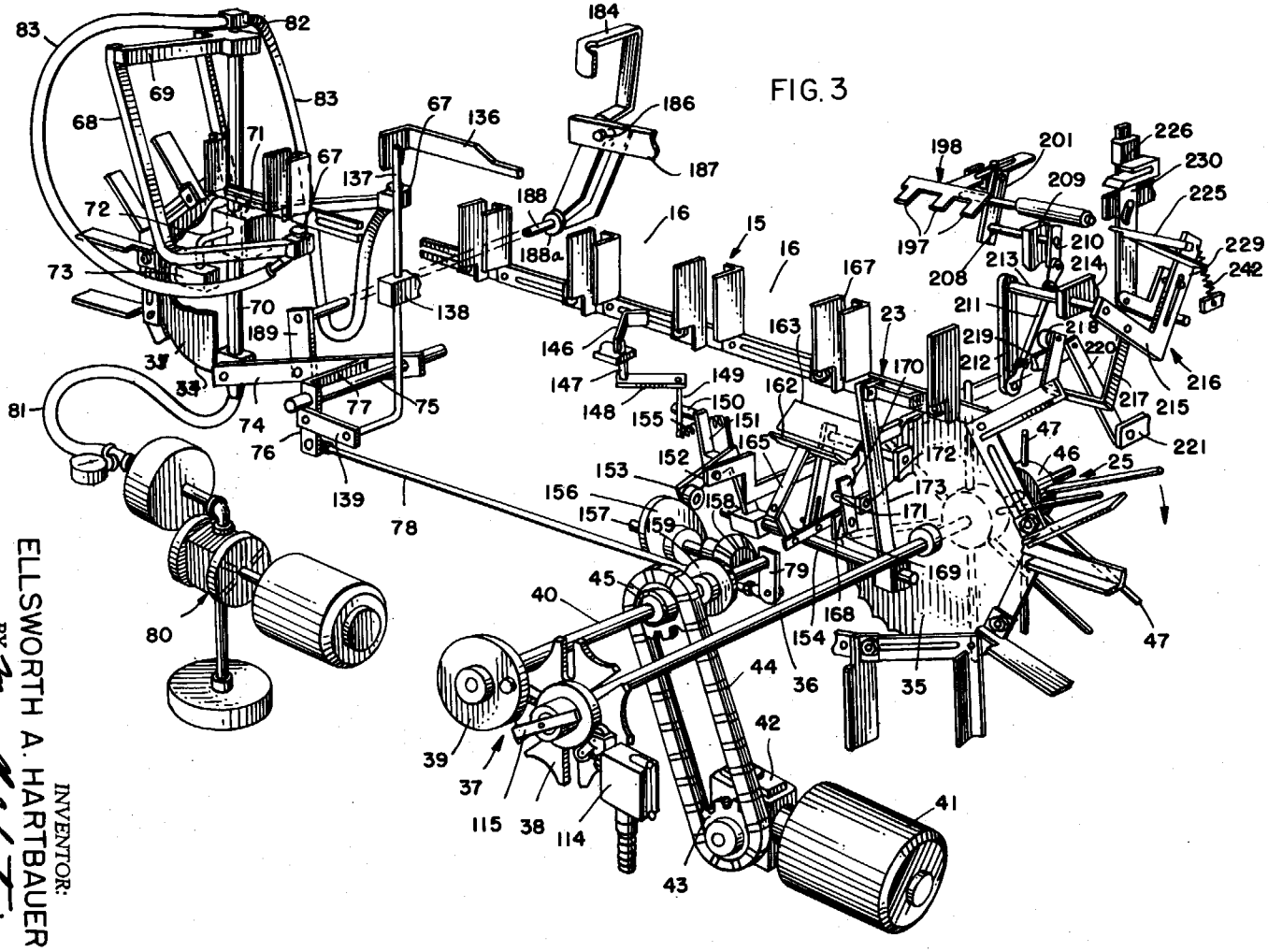
Fig. 3 is a diagrammatic view showing the moving components and the driving connections therebetween of the machine with various parts omitted for purposes of clarity.
Figures 10, 11:
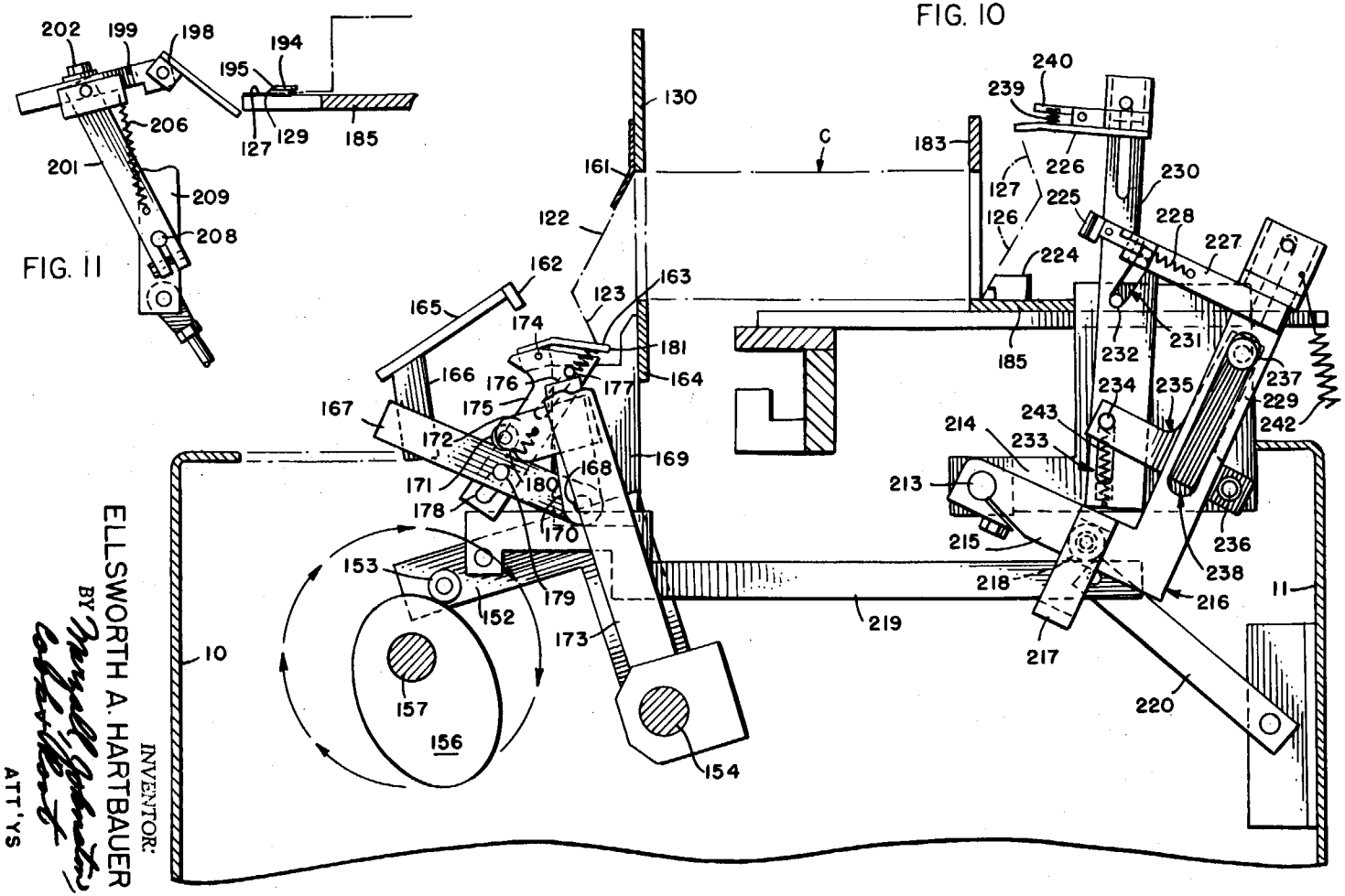
Fig. 10 is an enlarged transverse sectional view taken through the machine and illustrating the front and rear tuck flap tucking bars and related parts.
Fig. 11 is a detail side elevational view of the rear tuck flap breaker.

Referring now to the drawings and especially Figs. 1, 3 and 10, the packaging machine includes a cabinet structure having front and back walls 10 and 11 and end walls 12 supported above the floor by legs 13 which mount at their lower ends casters 14 for the purpose of easily moving the entire machine from one place to another. A conveyer, generally designated by the numeral 15, extends longitudinally of the machine and is provided with a plurality of spaced pockets or buckets 16 adapted to receive expanded or erected cartons and carry them along the machine. At the head end of the conveyer, a magazine 17 supports a stack of cartons in flattened condition; and an expanding device 18 takes the cartons one at a time from the magazine, expands the cartons and deposits them into a pocket 16 of the conveyer. A filling mechanism is arranged laterally adjacent the conveyer at the head end thereof and includes a plurality of article receiving chutes 19 and a reciprocable pusher 20 which serves to transfer articles from the chutes into cartons aligned therewith in the conveyer pockets. As the conveyer advances the cartons along the machine, a front tucking and closing assembly 21 and a rear tucking and closing assembly 22 closes the opposite ends of the cartons. The entire rear tucking and closing assembly is adjustably movable toward and away from the front assembly 21 to accommodate cartons of varying lengths. At the tail end of the conveyer 15, an ejector 23 ejects the filled and closed cartons from the conveyer pockets and onto a transfer or discharge table 24. A rotary transfer wheel 25 advances the cartons along the table 24 to make room for the subsequent or successively ejected cartons. For purposes of clarity, the actual supporting members for many of the operating components are not shown, but it will be understood that a suitable framework is provided for supporting the various operating components of the machine in cooperative relationship.

Figure 13:
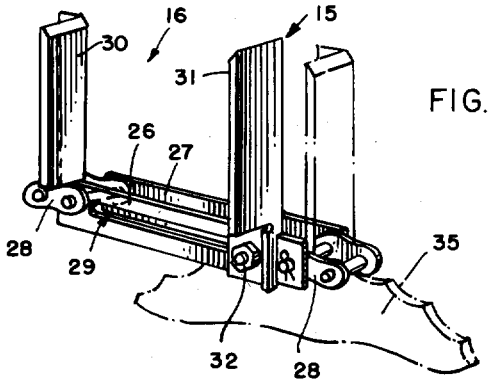
Fig. 13 is an enlarged fragmentary perspective view of a part of the pocket conveyer of the machine.

The conveyer 15 is effectively a chain conveyer and comprises a plurality of sets of parallel bars 26 and 27 connected together by chain links 28, Figs. 3 and 13, to form an endless conveyer. Each bar 26 is longitudinally slotted at 29 and has upstanding from one end a pocket forming plate 30 extending transversely to the longitudinal axis thereof. Parallel opposed to the pocket forming plate 30 is a second pocket forming plate 31 upstanding and adjustably mounted on the bar 26 by means of the nut and bolt assembly 32 which extends through the slot 29 and permits the plate 31 to be adjusted along the bar 26 to thereby accommodate cartons of varying widths or sizes. The chain conveyer 15 is trained over a guide plate 33 having an arcuate guide surface 34 at one end of the machine and over a drive sprocket 35 at the other end of the machine, Fig. 3. The guide plate 33 will, of course, be mounted on a rigid part of the machine framework, while the drive sprocket 35 is mounted on a drive shaft 36 rotatably supported in suitable bearings. The drive shaft 36 is driven step-by-step by the Geneva movement 37 which includes a driven wheel 38 connected to the drive shaft 36 and a driver 39 connected to a power shaft 40. When the machine is in operation, the power shaft 40 is operating continuously and driven by an electric motor 41 through a reducing gear assembly 42, a sprocket 43 mounted on the output shaft of the reducing gear assembly, and an endless chain or power transmission member 44 trained over the sprocket 43 and a sprocket 45 mounted on the power shaft 40. Thus, during operation of the motor 41, the power shaft 40 is driven continuously, while through the Geneva movement 47, the drive shaft 36 and the conveyer 15 is driven step-by-step. Also mounted on the drive shaft 36 for step-by-step movement is the rotary transfer wheel 25 which includes a pair of hubs 46 mounting a plurality of radial arms 47 which protrude through suitable slots or openings 48 in the transfer table 24, Fig. 1. Other movable components of the machine are driven from the power shaft 40 as will become more evident hereinafter.

Figure 14:
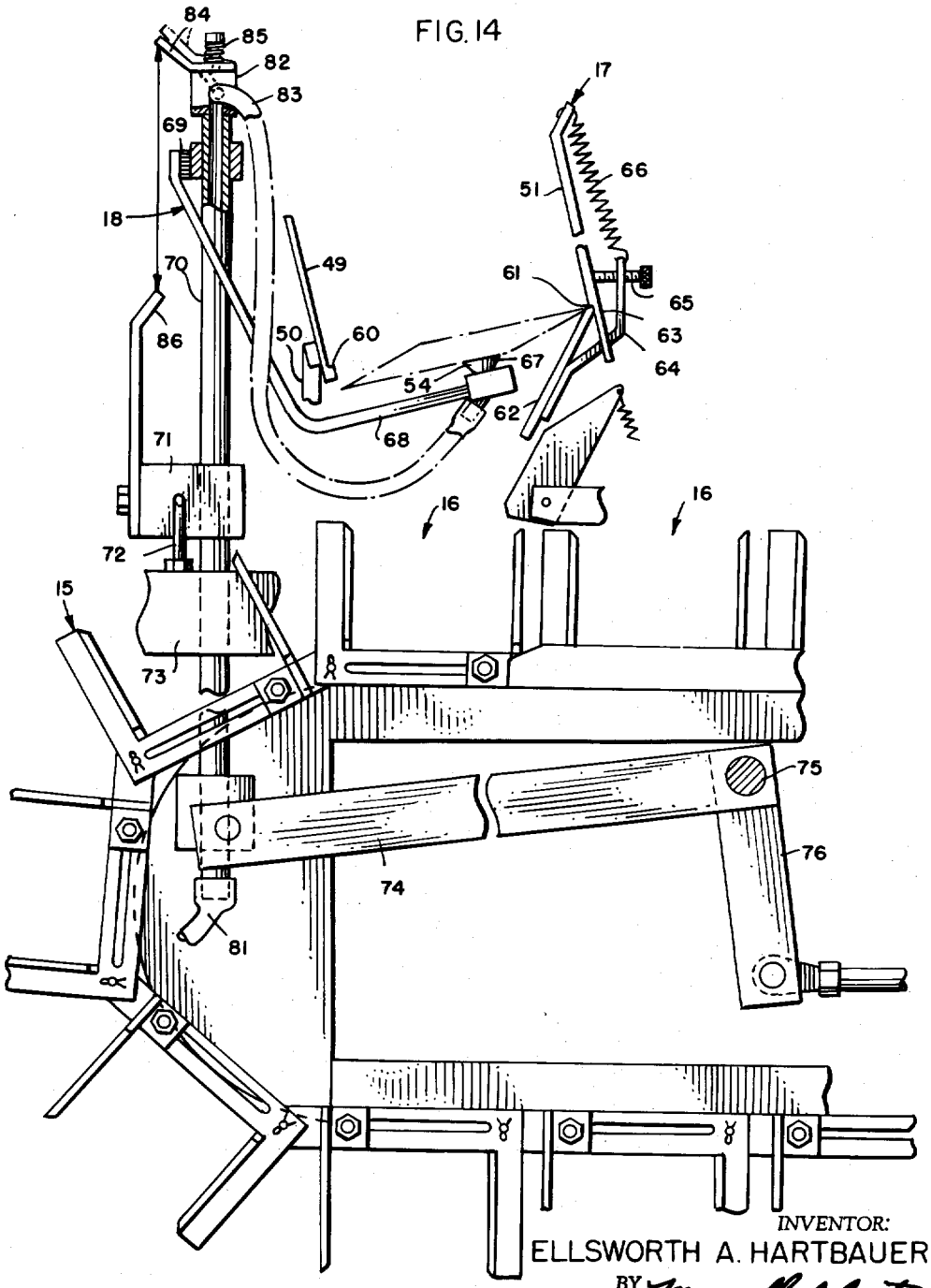
Fig. 14 is an enlarged front elevational view of the carton magazine and the carton expanding device shown in association with the head end of the conveyer.

The cartons are initially fed from the magazine 17 which includes a rear guide plate or wall 49 supported by the framework of the machine by a supporting bar 50, and a front adjustably mounted guide plate or wall, 51, Fig. 14. These walls are parallel to each other and inline rearwardly from the vertical to support a stack of cartons in flattened condition along an inclined plane. As seen most clearly in Fig. 1, the front wall 51 is supported from the rear wall 49 by a framework including a laterally extending rear bar 52 connected at one end to the rear wall 59 and at the other end to a forwardly extending side support bar 53. Extending inwardly from the outer end of the bar 53 and parallel to the bar 52 is a forward bar 54, the free end of which has adjustably clamped thereto a supporting leg 55 connected to the front wall by a clamp 56. A third upstanding guide plate or side wall 57 is secured to a supporting leg 58 which is adjustably clamped to the bar 53 by a clamp 59. This side wall 57 engages the rear ends of the flattened cartons and is perpendicularly positioned relative to the front and rear walls 51 and 49. Thus, any size of carton may be accommodated by the adjustable magazine 17.

As seen most clearly in Fig. 14, a pair of forwardly extending ledges or projections 60 are provided at the bottom edge of the rear wall 49 for engaging the rear edges of the lowermost carton within the magazine. The front edges of the lowermost carton in the magazine are supported on a ledge 61 formed at the upper end of an expander block or plate 62.

The expander block 62 is angularly related to the forward wall 51 and extends downwardly and rearwardly toward the rear wall, as seen most clearly in Fig. 14. A notch 63 is formed at the lower end of the forward wall 51 to receive the upper edge of the expander block 62. An angularly shaped brace 64 is suitably secured to the expander block 62 and provided with a set screw 65 at the other end for adjusting the inclination of the expander block 62 by having the inner end of the set screw bearing against the outer face of the front wall 51. A spring 66 maintains the expander block 62 in position and the set screw 65 in bearing engagement against the outer face of the front wall 51.

Because the magazine is inclined from the vertical in a manner as seen in the drawings, the center of gravity of a stack of cartons held by the magazine is displaced rearwardly so that the weight of the cartons is also shifted rearwardly and generally against the rear wall 49 and the inwardly extending ledges 60 at the lower end thereof. This relieves the pressure at the front or forward edges of the cartons thereby permitting only the front edge of each carton to engage the expanding block and consequently avoid marking of the front panel of each carton during the expanding operation. Further, since pressure at the front end of the carton is now relieved by inclining the magazine, it is not necessary to employ a carton clamp for holding the main portion of the stack of cartons when removing a carton from the magazine.

For the purpose of expanding the cartons from the flattened condition and depositing them into a pocket 16 on the conveyer 15, a pair of suction heads 67 grip the underside of the lowermost carton in the magazine in the manner as seen in Fig. 14, and move downwardly thereby expanding the carton against the expanding block 62 and consequently depositing the expanded carton into the pocket 16 aligned therewith while the conveyer is at rest. Each suction head 67 is adjustably carried on the end of substantially right angle supporting members 68, each of which is connected to a transversely extending support bar 69, Figs. 3 and 14. For reciprocating the suction heads, the support bar 69 is connected at its upper end to a hollow slide rod 70 slidably received in a block 71 pivotally carried on the end of a right angle bolt 72, the latter being rigidly secured to a longitudinal support 73 of the machine framework. One end of an actuating lever 74 is pivotally connected to the lower end of the slide rod 70, while the other end of the lever is freely supported on a stationary supporting shaft 75. A second lever 76 is pivotally mounted on the shaft 75 but spaced from the first lever 74 and angularly displaced therefrom substantially 90°. Between the levers 74 and 76, a connecting arm 77, Fig. 3, serves to connect these levers together so that they oscillate together. One end of a reciprocating rod 78 is pivotally connected to the free end of link 76 and also pivotally connected at its other end to one end of a rotating arm 79. The other end of the rotating arm is rigidly secured to the continually rotating power shaft 40 so that upon operation of the power shaft 40 the arm 79 rotates through 360° to impart a reciprocatory motion to the rod 78 and an oscillating motion to the links or levers 74 and 76 thereby imparting a substantially vertical reciprocatory motion to the slide rod 70 and suction heads 67. As the suction heads move downwardly, they expand a carton against the expander block and deposit it into a pocket of the conveyer 15.

The suction at the suction heads 57 is generated by a motor and pump unit 80, Fig. 3, which is connected to the hollow slide rod 70 by a flexible line 81. As seen in Figs. 3 and 14, a suction exhaust valve 82 is mounted at the top of the hollow slide rod 70 and connected to the suction heads 67 by flexible lines 83. This suction exhaust valve 82 includes an angularly shaped flapper plate 84 resiliently biased over an aperture on the top of the valve 82 by a spring 85. The aperture leads to the hollow of the slide rod 70. The flapper plate 84 is movable to a position to allow the valve 82 to exhaust and thereby break the suction to the suction heads when the outer end of the plate 84 is cammed upwardly against the upper free end of a camming bar 86 secured to the pivotal slide block 71. Thus, when the expanded carton has been properly deposited in an aligned conveyer pocket 16, downward movement of the slide rod 70 brings the flapper plate 84 into engagement with the camming bar 86 to break the suction to the suction heads and permit the further downward movement of the now non-operative suction heads prior to advancing the conveyer to the next position.

Figure 12:
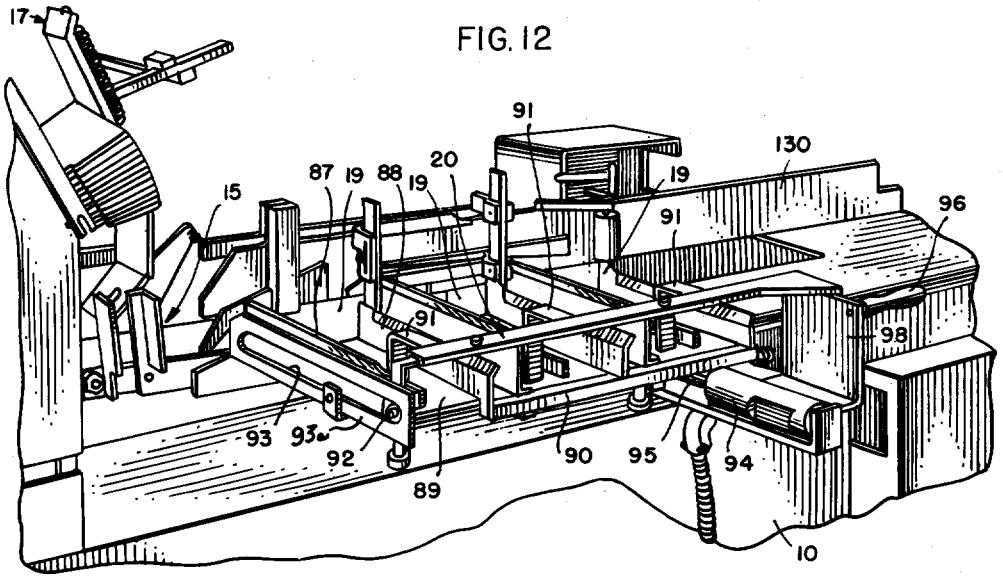
Fig. 12 is an enlarged front perspective view of the filling mechanism.
Figure 12A:
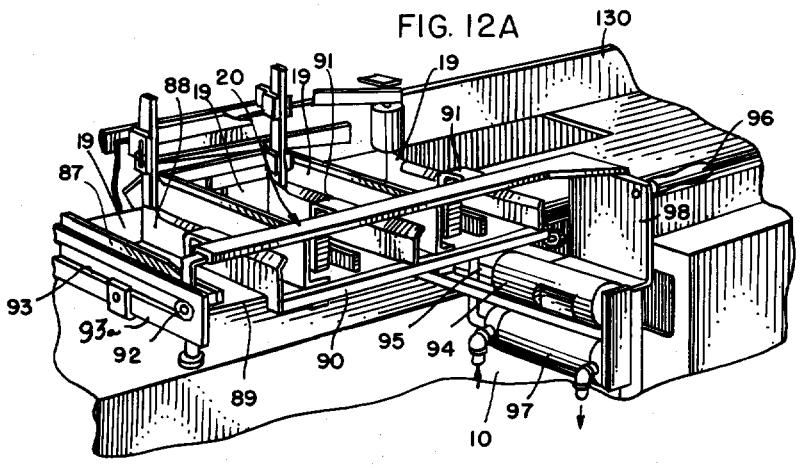
Fig. 12A is an enlarged front perspective view of a modified filling mechanism having a power-driven pusher.

Each article receiving chute 19 of the filling mechanism may be adjusted to accommodate articles of varying size, and each chute includes an upstanding stationary wall or guide 88 movable over the bottom 89 of the chute, Figs. 12 and 12A. All of the adjustable walls 88 are connected to a common bar 90 so that the adjustable walls may be moved in unison. The reciprocable pusher 20 includes pusher members 91, one arranged in each chute, and is provided with a roller 92 at one end slidably supported in an elongated slot or guideway 93 of a stationary support 93a rigidly supported by the machine frame and at the other end with a hollow cylindrical guide 94 slidable on an elongated guide rod 95. A handle 96 is secured to the pusher for manually reciprocating it along its rectilinearly guided path, as seen most clearly in Fig. 12. While the reciprocable pusher 20 is preferably manually operated, it will be appreciated that it may be power operated such as by a double acting hydraulic cylinder 97 as seen in the modified arrangement of Fig. 12A.

Moreover, any other type of filling mechanism may be employed such as a completely automatic arrangement. For example, the articles may be brought to the conveyor pockets by an endless belt conveyer and transferred to cartons in the pockets by a reciprocating conveyer which could be actuated in response to an article position switch.

Figure 15:
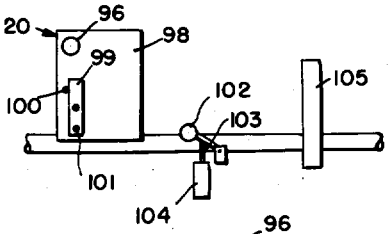
Figs. 15, 16, 17 and 18 are more or less diagrammatic views illustrating the sequence of operation for actuating the cycling start switch during operation of the reciprocable pusher means on the filling mechanism.
Figure 16:
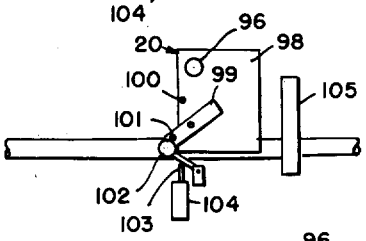
Figure 17:
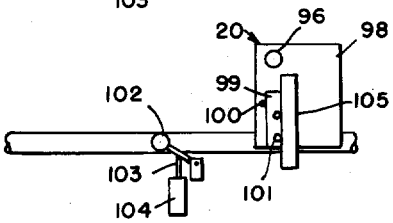
Figure 18:
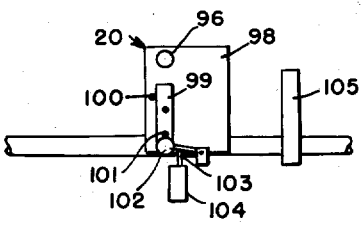

At the handle end of the pusher 20, a plate 98 pivotally carries an actuating bar 99, Figs. 1 and 15–18, which is generally free to rotate clockwise but prevented from rotating counterclockwise past the stop 100. Extending laterally and outwardly from the actuating bar 99 and at the end opposite from that which engages the stop 100 is a pin 101 which is arranged to engage a roller 102 mounted on the end of an arm 103 of a normally open cycling start or filler switch 104. Preferably, the start switch is of the microswitch type although any other type may be employed. During the loading or filling of the cartons aligned with the inner ends of the chutes 19 by advancing the pusher 20 toward the conveyer 15, the pin 101 hits the roller 102 and thereby causes the actuating bar 99 to rotate clockwise to an inclined non-operating position such as seen in Fig. 16 and thereby move the pin 101 of the actuating bar 99 out of the path of the roller 102 of the switch 104 without operating the switch. As the pusher is advanced forwardly to move the articles into the cartons in the conveyer and the plate 98 also advances forwardly, and as seen in Fig. 17, the upper forward edge of the actuating bar 99 engages a stationary reset bar 105 which operates to pivot the actuating bar in a counterclockwise direction to a vertical position against the stop 100. The actuating bar 99, being in this position as seen in Fig. 17, positions the pin 101 so that when the pusher 20 is retracted away from the conveyer, the pin 101 will be in the path of the roller 102 of the cycling start switch 104 to close this normally open switch and initiate a cycling operation of the machine. This cycling operation includes step-by-step advancement of the conveyer 15 to remove the filled cartons from alignment with the loading chutes and bring empty cartons into alignment with the loading chutes, as well as to control operation of the expander for expanding and depositing a carton into each pocket 16 of the conveyer as it is advanced past the magazine. Further, other operations will be effected on the cartons such as the tucking and closing of the carton ends and the ejecting of the filled and closed cartons from the discharge end of the conveyer to the transfer table 24.

Figure 19:
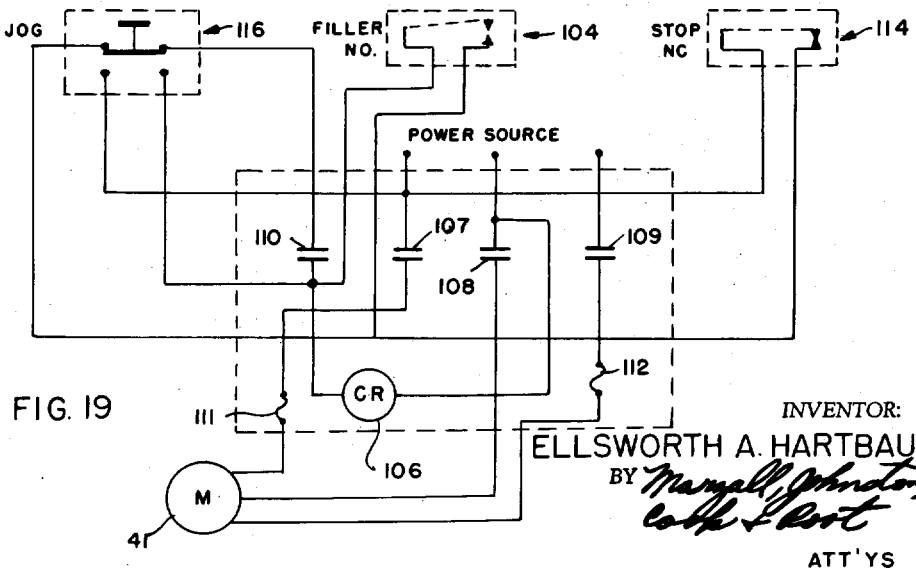
Fig. 19 is a schematic diagram of the electrical circuit for operating the machine.

In effecting the cycling operation, momentary closing of the normally open cycling start switch 104 energizes a control relay 106, Fig. 19, which, in turn, closes contacts 107, 108 and 109 to connect the motor 41 to a power source. Also contacts 110 are closed which effectively serve as a hold circuit to hold the control relay 106 in energized position after the normally open cycling start switch has been released by movement of the pin 101 beyond the roller 102 to a position such as seen in Fig. 15. Overload devices 111 and 112 are provided in some of the power lines to the motor as a safety precaution against overloading of the motor 41. Should the loading chutes be jammed for any reason, the pusher 20 will not advance forward enough toward the conveyer whereby the actuating bar 99 will not be pivoted to the position shown in Fig. 17. Then retraction of the pusher 20 away from the conveyer with the bar 99 in inclined position, as seen in Fig. 16, will not effect starting of the cycling operation since the pin 101 will pass above the roller 102 of the cycling start switch 104. This safety precaution precludes the possibility of jams in the machine which might be caused by inserting the articles of merchandise only part way within the cartons. The control relay 106 and its contacts on the overload devices may be enclosed within a control box 113 mounted on the front wall 10 of the machine as seen in Fig. 1.

The cycling operation will be such as to advance the filled cartons from alignment with the loading chutes and advance empty cartons into alignment with the loading chutes and therefore comprise three step-by-step advances of the conveyer with respect to the present machine. However, it will be appreciated that more or less than three chutes may be employed on any one machine and that the cycling operation would be adjusted accordingly.

The driven wheel 38 of the Geneva movement 37 in the present machine is provided with six indexing positions, only three of which would be used in any one cycling operation of the machine. Stopping the machine after three step-by-step movements of the conveyer have been completed is accomplished by the normally closed cycling stop switch 114, Figs. 1, 3, and 19. This switch is mounted adjacent to the driven wheel 38 of the Geneva movement, and is opened to deenergize the control relay 106 by an actuating bar 115 mounted on the outer end of the power shaft 36, Figs. 1 and 3. The actuating bar extends transversely to the shaft 36, wherein one end of the bar functions to stop one cycling operation while the other end of the bar functions to stop the successive cycling operation. Thus, after the machine has completed one cycle of operation, it will automatically stop and be ready for the next filling operation. It may be noted that the cycling stop switch 114 is similar in construction to the start switch 104 in that it also includes a roller and arm arrangement wherein the roller is engaged by the actuating bar 115 to operate the switch.

Since there is occasion for operating the machine and advancing the conveyer without relying on the automatic cycling operation, a push button jog switch 116 is provided, Figs. 1 and 19, which will operate the motor 41 for any desired interval of time. For example, in either setting up the machine or clearing away a jam in the machine, it may be desirable to have the conveyer advance slowly or the moving components of the machine to move a short distance, and in such situations the jog switch 116 bypasses the normally open filler switch 104 and operates the machine.

The tucking and closing assemblies 21 and 22 herein disclosed are arranged to tuck and close a reverse tuck flap carton such as the carton C as seen in Fig. 2. However, it may be readily appreciated that the rear tucking and closing assembly 22 may assimilate the front tucking and closing assembly 21 to permit the machine to use a straight tuck carton. Further, the tucking and closing assemblies may be designed to handle glued end cartons. The reverse tuck carton C includes side walls 117, top and bottom walls 118 and 119, front side flaps 120 and 121, a front end panel 122, a front tuck flap 123, rear side flaps 124 and 125, a rear end panel 126 and a rear tuck flap 127. The carton in its expanded condition will look exactly like it is shown in Fig. 2. The front end panel 122 and front tuck flap 123 are separated by a score line 128, while the rear end panel 126 and rear tuck flap 127 are separated by a score line 129. The front and rear side flaps will extend straight out from the top and bottom walls. Thus, it is seen that it is necessary during the tucking and closing operations to close the side flaps, break the tuck flaps against the end panels and close the end panels and tuck flaps so that the tuck flap is received between the side flaps and the respective top and bottom walls of the cartons. This is accomplished by the front and rear tucking and closing assemblies 21 and 22.

The front tucking and closing assembly 21 includes an elongated carton hold-down plate 130 extending along the conveyer, Fig. 4, on the forward side of the conveyer pockets and which is mounted adjustably above the bottoms of the loading chutes 19 and the conveyer pocket bottoms. The cartons are further held in proper position in the pockets of the conveyer by a stationary bottom rail 130r coacting with the upper rail 130. The upper rail is adjusted so the carton fits freely between the upper and lower rails. The discharge end of the plate 130 at the discharge end of the conveyer is mounted in spaced relationship above the framework by a vertical supporting bar 131, Fig. 1 and Fig. 4, which is clamped to a frame piece 131a by a clamp 131b, and the entire plate may be adjustably moved up and down to accommodate varying sizes of cartons. Similarly, the other end of the plate 130 is adjustably mounted on an upstanding frame piece 130a by means of a clamp and bracket assembly 130b, Fig. 1.

The cartons are placed in the magazine so that when they are expanded the front end panel and front tuck flap 122 and 123 will extend forwardly of the conveyer pocket and the front tucking and closing assembly 21 will function to close this front tuck flap and end panel arrangement. As each carton C is advanced by the conveyer toward the front end of the elongated plate 130, the top wall of the carton will pass under the bottom edge of the plate 130 and the score line between the top wall 118 and the front end panel 122 will be substantially directly underneath the plate 130. Thus, the carton will be held down at the front end by plate 130. A first plow or cam 132, suitably secured to the support plate 130, coacts with the fore end 133 of the plate 130 to receive the front end panel and front tuck flap of the carton therebetween and fold it upwardly along the score line between the top wall and the front end panel until the front end panel and the front tuck flap are substantially at 90° to the top wall of the carton, as seen in Fig. 4. Thus, the plow 132 effectively folds upwardly the front end panel and front tuck flap of the carton and the vertical plate 130 serves as a backing member against which the front end panel and front tuck flap may be urged. The front side flaps 120 and 121 will be permitted to be free thereby keeping them in an extending position away from the opposite side walls of the carton.

As the carton is advanced to the next position by the step-by-step conveyer which will put it in front of the next chute, the front end panel is received behind a breaker bar 134, while the tuck flap is urged outwardly from the plate 130 by a plow or cam 135. The plow 135 is also adjustably clamped to the frame piece 130a by a clamp and bracket assembly 135a, Fig. 1 and interconnected to the breaker bar 134. The upper edge of the breaker bar 134 is relatively thin and will lie directly along the score line 128 between the front tuck flap and the front end panel since it is necessary to fold over the tuck flap or break the tuck flap at this score line. Again, the bar or plate 130 serves to coact with the breaker bar 134 and hold the front end panel therebetween. At this position when the conveyer is at rest, a movable breaking bar 136 is brought vertically downwardly to engage behind the tuck flap and break it over the breaker bar 134 and thereby condition the tuck flap relative to the end panel for subsequent closing thereof. The breaking bar 136 is reciprocated upwardly and downwardly by the rotating arm 79 on the continuously driven shaft 40 through the reciprocating rod 78 and the lever 76, Fig. 3. The breaking bar 136 is connected to the upper end of a slide rod 137 which is loosely slidable in a bore formed in a part 138 of the framework. The lower end of the slide rod 137 is angularly bent at right angles thereto and pivotally received in the end of an arm 139, the other end of which is secured to the intermediate portion of the reciprocating lever 76.

Referring again to Fig. 4, the plow 135 is broadened at 140 so as to overlap the breaking bar 134 at the next station and thereby hold the tuck flap in folded position. This is the last station which aligns with the loading chute and so it will be appreciated that all of the cartons originally aligned with the loading chutes will be filled so that when the carton leaves the station of this last chute it may then be closed up. To further crease the tuck flap at the score line between the tuck flap and the end panel, a resiliently biased roller 141 is arranged at the end of the breaker bar 134 so that the folded tuck flap and its panel will be urged in folded position against the plate 130 as the carton passes this point. The roller 141 is mounted on a vertical shaft to rotate thereon and the shaft is carried by a supporting lever 142 pivotally supported at its other end to a fixed part of the framework. A spring 143 serves to resiliently bias the roller and arm into position so that the tuck flap is held in folded position against the end panel. At the station beyond the last chute, a plow or guide 145 serves to fold in the leading side flap 121, while a rotating folder 146 folds in the trailing side flap 120 at the same time. Actually, the folder 146 operates while the conveyer is at rest and oscillates back and forth on an upstanding shaft 147 rotatably mounted in a part of the framework as seen in Fig. 3.

Referring particularly to Fig. 3, the bottom end of the shaft 147 is secured to a horizontally extending lever 148 which has a downwardly extending pin 149 attached to its free end. This pin is engaged by a roller 150 mounted on the end of a pivoting lever 151 which is secured to a cam operated arm 152 having a cam follower 153 mounted thereon. The arm 152 is right angularly shaped and rigidly mounted on a longitudinally extending shaft 154 bearingly carried by the framework of the machine. A spring 155 is secured at one end to the pin 149 and at the other end to the cam operated arm 152 to constantly bias the pin 149 against the roller 150. A cam 156 is mounted on a longitudinally extending rotatable shaft 157 and the cam 156 is in engagement with the cam follower 153 at all times. The cam 156 is driven continuously by the continuously driven shaft 40 through a pair of meshing bevel gears 158 and 159, the gear 158 being secured to the shaft 157 and the gear 159 being secured to the shaft 40. The arm 79 on the shaft 40 sits behind and clear of the bevel gear 158 so it can operate without hitting this gear.

Referring now again to Fig. 4, an extension 160 from the plow 145 maintains the side flaps in folded position during movement of the carton to the next successive station, while the front tuck flap and front end panel are released from the creasing roller 141 and engaged by a plow 161 adjustably mounted on the plate 130 which folds the end panel downwardly to the position as seen in the next station preparatory to closing of the end panel and tuck flap of the carton.

Closing of the front end panel and inserting of the tuck flap between the side flaps and the bottom wall of the carton is accomplished at the next station by the tucker bar 162 and the tuck flap aligning plate 163. The mechanism for operating the tucker bar and the tuck flap aligning plate includes a linkage arrangement as seen in Figs. 3 and 10.

As seen most clearly in Figs. 3 and 10, the tucker bar 162 is connected to a U-shaped linkage arrangement including connected bars 165, 166 and 167, the latter of which is secured to a shaft 168 pivotally mounted on a stationary plate 169 of the framework. Also secured to the shaft 168 is an actuating lever 170 which is oscillated by a roller 171 mounted on a link 172. The link 172 is rigidly secured intermediate an upstanding support bar 173 which carries at its upper end the ejector 23 and is secured at its other end to the oscillating shaft 154. Thus, oscillation of the shaft 154 by the cam 156 oscillates the tucker bar 162 to perform the tucking operation.

In order to align the leading edge of the tuck flap 123 as it is inserted between the bottom wall of the container and the front side flaps the aligning plate 163 moves upwardly and inwardly as the tucker bar 162 moves inwardly. The aligning plate 163 is pivoted at one end to a pin 174 carried on a supporting bar 175, Fig. 10. A longitudinally extending slot 176 is provided in the upper end of the supporting bar 175 for slidably engaging a pin 177 mounted on the rigid supporting plate 169. At the other end of the supporting bar 175, a second slot 178 slidably receives a pin 179 rigidly secured to the lower bar 167 which supports the tucker bar 162. The slot 178 is slightly angularly related to the longitudinal axis of the bar 175. A spring 180 is carried by the supporting bar 175 to resiliently bias the pin 179 toward the lower end of the slot 178 when the linkage is in operation. Preferably, the tucker bar 162 will be adjusted so that it will engage the front end panel 122 just above the score line between the front end panel and the front tuck flap 123. As the shaft 154 oscillates to actuate the tucker bar and aligning plate, when the pin 179 of the tucker bar supporting assemblage reaches the top of the slot 178, continued movement will cause the aligning plate 163 to move upwardly and inwardly toward the carton along the path of pin 177 and the slot 176. The aligning plate 163 will be arranged so that it will move upwardly a greater distance than the bottom wall of the carton, but the tucker bar 162 will engage the aligning plate and move it downwardly on the pivot 174 against the biasing of a spring 181. The tucker bar and aligning plate will only operate when the conveyer is at rest.

The rear tucking and closing assembly 22 opposes the front tucking and closing assembly 21 and is on the opposite side of the conveyer. During the tucking and closing operations on the front tuck flap and end panel, tucking and closing operations are also being performed on the rear tuck flap and end panel in a similar fashion but with slight changes inasmuch as the rear end panel and tuck flap are coextensive with the bottom of each carton. Looking at Fig. 5, each carton moves from right to left, and as it is carried to the first station opposite the first loading chute, the leading rear side flap 125 is folded over by a plow or cam 182 adjustably secured to the fore end of a longitudinally extending vertical flap holding bar 183 which maintains the flaps in folded position during the travel along the machine. At this station the trailing rear side flap 124 is also folded inwardly by a movable folder 184, while the rear tuck flap 127 and rear end panel 126 is supported along a horizontally and longitudinally extending plate 185. The rear side flap 124 is also held in folded position by the holding bar 183. The plate 185 further serves to support each rear edge of the carton bottoms as the cartons are advanced. The movable folder 184 oscillates back and forth and is pivoted at 186 to a rigid frame part 187 connected to the plate 185 of the rear tucking and closing assembly 22, Fig. 3. A cross rod 188 engages at one end a roller 188a slidably carried thereon which is slidably retained in a slot formed in the lower portion of the movable folder 184. A connecting line 189 is secured at the other end, the latter of which is secured intermediate the actuating lever 74 and actuated thereby. The slidable connection between the roller 188a and the rod 188 permits the entire rear assembly 22 to be moved away from or toward the conveyer when adjusting for carton length.

Up and down movement of the cross rod 189 in the slot of the folder 184 serves to oscillate the folder back and forth on the pivot 186.

The bar 183 is supported on framework of the rear assembly 22 and a carton hold down guide 190 is spaced thereabove which holds down the rear ends of the cartons wherein the rear edge of the upper wall of each carton travels substantially directly underneath the bottom edge of the bar 190. This hold down guide or bar is adjustably carried on the framework of the rear assembly 22 by clamping assemblies 190a and 190b, Fig. 5. Initially, the cartons are guided beneath the bar 190 by an adjustable guide bar 191. The longitudinally extending bar 183 also serves to hold the side flaps in closed position as the cartons advance through successive stations along the conveyer. Thus, the cartons are received at their rear ends between the bar 183 and the plate 185 and the bar 190 may be adjusted up or down to accommodate variations in carton height.

The next successive station shows the carton as being arranged so that the side flaps are completely folded inwardly and held inwardly by the holding bar 183. At this station, the rear end panel has its leading edge forced downwardly beneath the downwardly sloping guide or plow 192 secured to the bar 183 and spaced slightly above the table or supporting plate 185.

Figure 7:
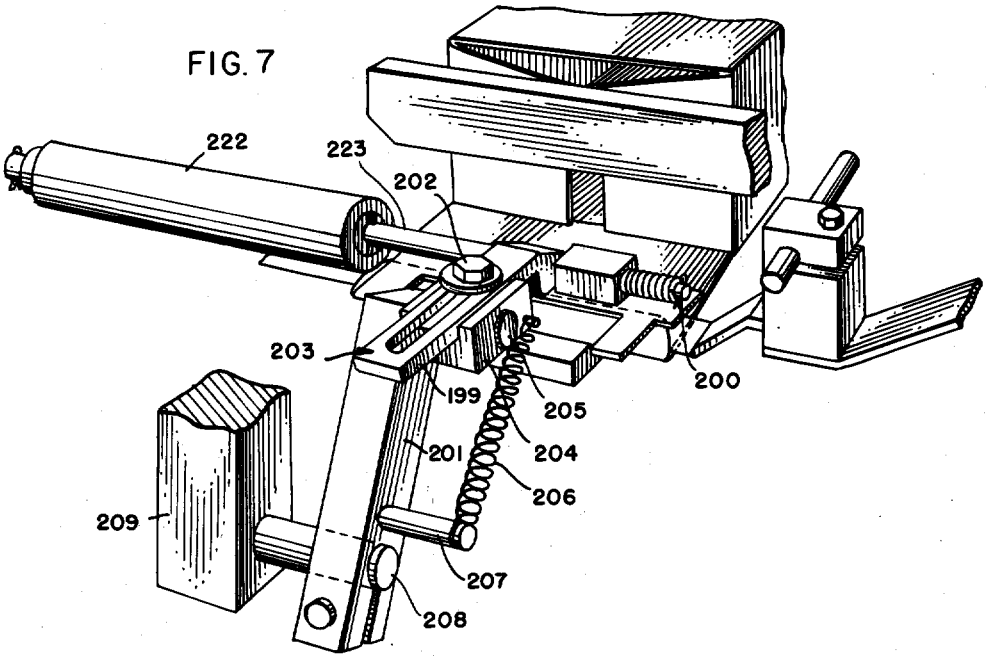
Fig. 7 is a greatly enlarged detail view of the tuck flap breaker of the rear tucking assembly.
Figure 8:
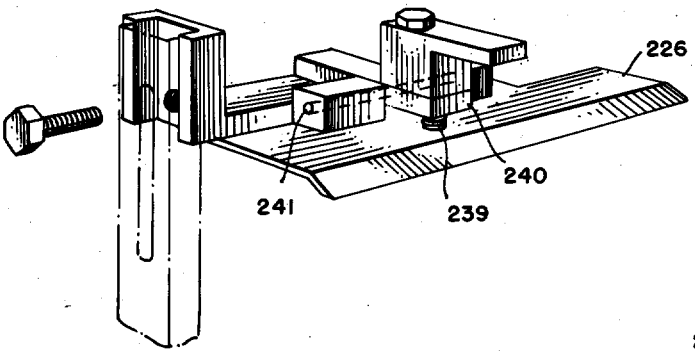
Fig. 8 is an enlarged perspective view of the tuck flap guide plate of the rear tucking and closing assembly.
Figure 9:
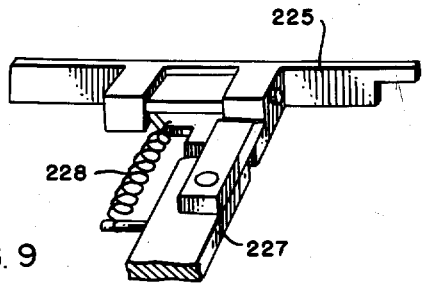
Fig. 9 is a detailed perspective view of the tuck flap tucking bar of the rear tucking and closing assembly.

The guide 192 is adjustably secured to a supporting block 193 mounted on the bar 183. Extending from the other side of this supporting block, a thin tuck flap breaker bar 194 having a sharp outer edge 195, Fig. 11, lays resiliently against the supporting table 185 and in parallel relation to the path of conveyer travel. This breaker bar is adjusted so that the outer sharp edge 195 coaligns with the score line 129 extending between the rear tuck flap 127 and the rear end panel 126 as seen in Fig. 11 so that the tuck flap 127 may be folded over this breaker bar and conditioned for subsequent insertion into the carton. Thus, at this station the rear end panel is received between the breaker bar 194 and the supporting plate 185. The supporting plate 185 at the station opposite the breaker bar 194 is provided with outwardly open slots 196, three in this case although any number may be employed, which freely receive fingers 197 on a movable breaking plate 198, Fig. 3, which is arranged to come in toward the conveyer underneath the outer edge of the tuck flap 127 as seen in Fig. 11. The breaking plate 198 is pivotally mounted on the end of an arm 199 and resiliently biased to the position as seen in Fig. 11 by a spring 200, Fig. 7. The arm 199 is adjustably secured to an upstanding lever 201 by a nut and bolt assembly 202 coacting with a longitudinally extending slot 203 in the arm 199 as seen in Figs. 7 and 11, and a pivotal block 204 pivoting on a pin 205 secured to the lever 201. This pivot block is biased to a predetermined position by a spring 206 secured at one end to the block 204 and at the other end to a pin 207 extending laterally from the lever 201. The lower end of the lever 201 is secured to a shaft 208 which is journalled in a stationary part of the framework of the rear tucking and closing assembly as indicated at 209 in Figs. 3 and 7. At the other end of the shaft, an oscillating lever 210 is mounted thereon and has its free end pivotally connected to a rod 211, Fig. 3. The rod 211 connects pivotally to a lever 212 having one end secured to a longitudinally extending shaft 213 mounted bearingly in a machine part 214 of the rear assembly.

Also connected to the shaft 213 is an arm 215 of a bell crank 216. Intermediately secured to the arm 215 is one end of a U-shaped bar 217 the other end having a roller 218 mounted thereon and engageable with the top edge of a transversely extending bar 219. One end of the bar 219 is pivotally attached to one end of a link 220 which has its other end pivotally connected to a machine part 221 of the machine frame, while the other end of the bar carries a right angularly shaped section which is pivotally connected to the cam operated arm 152 intermediately thereof. Thus, rotation of the cam 156 causes the transverse bar 219 to follow an arcuate path dictated by the movement of the link 220 which imparts an upward and downward movement to the U-shaped bar 27 causing the bell crank 216 to oscillate about the shaft 213.

Oscillation of the shaft 213 causes the arcuate movement of the levers 212 and 210 connected by the rod 211 to thereby cause oscillation of the shaft 208 and reciprocation of the breaking plate 198. The mechanism operating the breaking plate 198 is timed to break the tuck flap across the breaker bar 194 when the conveyer is at rest. Inward movement of the breaking plate 198 causes the fingers and breaker to be somewhat stopped by the edge 195 of the breaker bar so that they pivot therearound and over the outside of the tuck flap to thereby fold the tuck flap over against the top of the breaker bar 194 as seen in Fig. 7. The breaking plate 198 will be adjusted so that as it folds the tuck flap 127 across the breaker bar 194, it and the supporting arm 199 will pivot against the force of the spring 206 and thereby apply a resilient force against the tuck flap and the breaker bar 194. As the breaking plate retracts from the support plate 185, the force of the spring 200 will cause the breaker 198 to return to its normal position as seen in Fig. 11 and the spring 206 will cause the supporting arm 199 to return to its normal position as seen in Fig. 11 so that it will now be ready for the next inward movement to break the tuck flap of the next successive carton as it moves into position.

Referring again to Fig. 5, as the carton moves to the next station beyond the breaking plate 198, and dwells at the next station, the tuck flap will be further creased against the rear end panel by a creasing roller 222 rotatably mounted on a shaft 223 extending laterally from the supporting arm of the breaking plate 198. The breaker bar 194 extends along the supporting plate 185 and terminates at a position so that at the next successive station it will continue to hold the rear end panel down against the supporting table and provide a positive breaking point between the tuck flap and the end panel to preclude the possibility of developing a second crease in the end panel.

As the carton is advanced by the conveyer from the creasing roller station, the rear end panel is cammed upwardly by a plow or cam 224 adjustably mounted on the top surface of the horizontal support plate 185 as seen in Fig. 5. The rear end panel and the rear tuck flap is then positioned for closing at the next successive station where the conveyer dwells. As seen in Fig. 10, the plow 224 raises the rear end panel 126 to a nearly upstanding position.

Referring now particularly to Figs. 3, 8, 9, and 10, the rear end of the carton is closed by a rear tucker bar 225 coacting with a rear tuck flap aligning plate 226. The tucker bar 225 is pivotally carried on the end of a supporting arm 227, Fig. 9, and resiliently biased to a predetermined position by a spring 228 so that the leading end of the tucker bar will move in slightly ahead of the trailing end thereof. The front end of the carton is held more relatively square by the opposed plates of the pockets while the rear end of the carton is subjected to considerable drag which generally prevents the substantially rectangular shape of the carton from being accomplished at the rear end thereof and necessitates pushing in the trailing end of the tuck flap first in order to preclude jamming of the tucking operation at this point. The tuck flap and end panel are closed by the inward and upward movement of the tucker bar 225 and the inward and downward movement of the tucker plate 226. The tucker bar support arm 227 is adjustably secured to the upper end of arm 229 of the bell crank 216 and accordingly moves inwardly and outwardly by movement of the transversely extending actuating bar 219.

Similarly, the rear tuck flap aligning plate 226 is adjustably secured to the upper end of a movable supporting arm 230, Fig. 10. An angular slot 231 is formed in the supporting arm 230 intermediate thereof for slidably receiving a pin 232 secured to the stationary machine part 214 of the rear assembly. At the lower end of the supporting arm 230, a longitudinally extending slot 233 slidably receives a pin 234 secured to one end of an inverted T-shaped lever 235. The T-shaped lever 235 is pivotally connected to the machine part 214 by a stud shaft 236, while the upper end of the lever rotatably carries a roller 237 slidably received in a longitudinally extending slot 238 in the arm 229 of the bell crank 216. Accordingly, counterclockwise movement of the bell crank 216 about the shaft 213, as seen in Fig. 10, causes the tucker bar 225 to move inwardly and pivot the T-shaped lever 235 in a counterclockwise direction around the shaft 236. When the pin 234 on the T-shaped lever 235 engages the bottom of the slot 233 in the supporting arm 230, it will pull down the supporting arm 230 and cause the arm to move inwardly and downwardly along the guide slot 231 and the pin 232 to align the tuck flap 127 for entry between the rear side flaps and the top wall of the carton. This linkage arrangement is such that the aligning plate 226 will move the tuck flap 127 downwardly to a point below the top wall of the carton whereby the tucker bar 225 as it moves in will also engage the aligning plate 226 as well as the top edge of the rear end panel 126 and bias upwardly the plate 226 against the force of a spring 239 arranged between the top of the aligning plate 226 and a support member 240 to which the plate 226 is pivotally mounted by a pin 241, Fig. 8. As the tucker bar 225 and aligning plate retract after performing a tucking and closing operation, a spring 242, Fig. 10, will aid in bringing the parts back to their initial position and a spring 243 will urge the T-shaped member 235 to its initial position.

The mounting plate 214 of the rear assembly is connected to the plate 185 and other parts of the rear assembly and is adjustably mounted to the framework of the machine so that it may be moved inwardly and outwardly from the conveyer thereby lending the parts to adjustability for accommodating variations in carton lengths. To move the rear tucking and closing assembly 22 toward or away from the conveyer, it is only necessary to loosen clamps 244 and 245, Fig. 5, whereby all of the operating components of the rear assembly including the plate 185, the plows, hold down rail, tuck flap breaker, and tucker may be moved together as a unit. In this respect, the roller 218 on the U-shaped bar 217 which supplies all the power to these moving parts may merely move anywhere along the top edge of the transverse bar 219 to operate the parts. And inasmuch as the movable folder 184 is also mounted on the rear tucking and closing assembly, it also will move during adjusting thereof.

Advancing of the conveyor beyond the closing and tucking stations and to the ejecting station brings each carton onto the discharge table 24 which extends rearwardly beyond the folding bar 183 of the rear tucking and closing assembly as seen in Figs. 1 and 5 but still under the very end of the rear hold down bar 190. Mounted on the very end of the hold down bar 190 and on the side remote from the conveyor is a longitudinally extending spring pressed roller 246, Fig. 5. The last station at the far left in Fig. 5 shows a carton being ejected from the conveyer pocket associated therewith wherein the ejector 23 merely transfers the carton toward the rear of the machine and beneath the spring-pressed roller 246. Preferably, the roller is constructed of nylon, and it serves to slow down the ejection of the carton by resiliently urging the carton and contents against the table 24. The roller 246, being nylon, will not mar or mark the carton. Further, the roller will prevent the contents of the carton from moving relative the carton and possibly opening an end panel. The bracket supporting the roller is adjustably mounted on the bar 190 so that the desired pressure against the cartons can be regulated. Rotation of the rotary transfer wheel 25 then causes the arms 47 thereof which extend through openings 48 in the discharge table 24 to advance the package longitudinally along the discharge table after the carton has cleared the conveyer pocket.

Figures 20, 21:
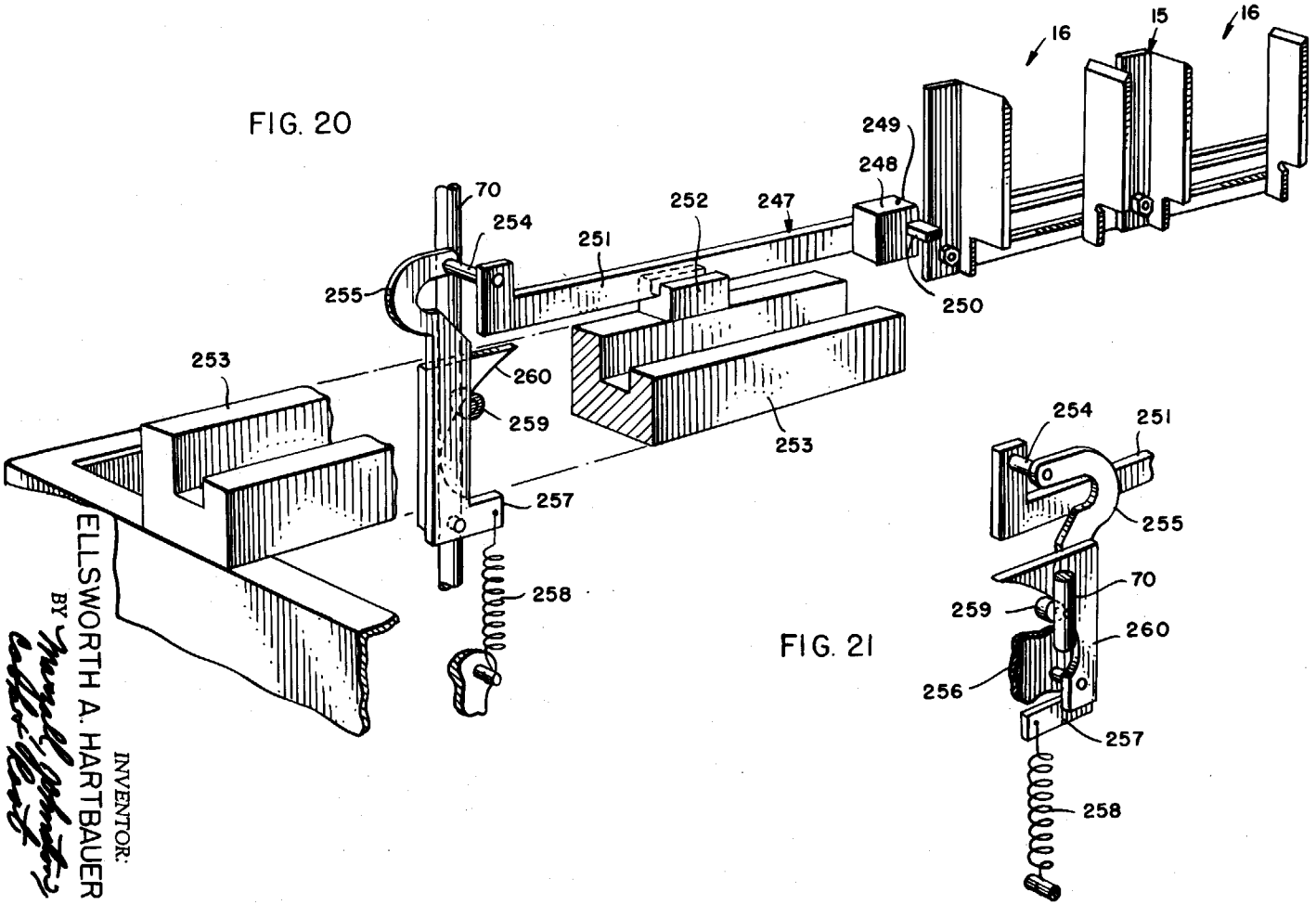
Fig. 20 is an enlarged perspective view, partially fragmentary, of the head end of the machine and the pocket extender.
Fig. 21 is a detailed perspective view of the actuating lever on the pocket extender looking at the side mounting the cam.

The present invention, being capable of handling cartons of various sizes, must be able to handle the various sizes with substantially equal facility. The pockets of the conveyer are arranged to embrace the front end of the cartons during the carton closing operations. Accordingly, longer cartons have a great deal of the carton extending rearwardly of the pocket in unsupported fashion; and in such cases, frictional drag on the rear end of these cartons precludes the rear tucking and closing assembly from operating thereon effectively and thereby produces defective cartoning. This difficulty is largely overcome by providing a pocket or bucket extension 247, Figs. 20 and 21, which comprises a block 248 having a front carton engaging face 249 coaligned with the carton engaging face of the rear pocket forming plate 30 of each pocket 16. A spring biased detent 250 is pivotally carried by the block which permits the retracting movement past the pocket forming plates, but does not permit the block to move by the plates in the forward direction.

The carton engaging block effectively forms a continuation of the rear pocket forming plate and is spaced laterally adjacent thereto toward the rear tucking and closing assembly. This extension 247 is mounted to move with the pockets between the carton receiving station to the first station of the tucking and closing assemblies, and will retract when the conveyer is at rest to the pocket below the magazine before the carton is inserted into that pocket. A slide bar 251 supports the carton engaging block on one end and is slidably received in a grooved guide block 252 mounted on a longitudinally extending beam 253 of the machine. The other end of the slide bar is pivoted to a pin 254 supported at the upper end of an actuating lever 255 and the carton block 248 is gravity loaded on the slide block 252. The lower end of the actuating lever 255 is pivotally mounted on a bracket 256 extending downwardly from the longitudinally extending beam 253. An arm 257 integral with the lower end of the lever 255 has attached thereto one end of a spring 258. The other end of the spring is secured to a stationary part of the frame, whereby the spring urges the lever forwardly to, in turn, urge the carton engaging block 248 in the same direction as the conveyor moves and in alignment with the pocket forming plate of the pocket that is engaged by the detent 250.

Retraction of the pocket extension 247 to the pocket below the magazine is accomplished by the upward stroke of the suction cup slide rod 70 which has a cam follower or roller 259 mounted thereon and in engagement with a cam 260 secured to said actuating lever 255. As the suction heads move downwardly to expand in the aligned pocket, the extender is released from action by the cam roller to align with the back pocket forming plate by action of the spring 258. Advancing of the conveyor pocket permits the carton engaging block to advance therewith upon the action of spring 258 and aid in shoving the carton forward.

In the cartoning of highly frangible merchandise which would necessarily require hand cartoning, the cartons may be expanded and closed at one end by the machine of the present invention, wherein either the front or back tucking and closing assembly may be effectively disconnected to obtain closing of only one end of each carton. Further, should it be desirable to carton merchandise in a straight tuck carton, the rear tucking and closing assembly could be made like the front tucking and closing assembly.

It will be understood that modifications and variations may be effected without departing from the scope of the novel concepts of the present invention, but it is understood that this application is to be limited only by the scope of the appended claims.

The invention is hereby claimed as follows:

1. In a packaging machine adapted to package articles in an expanded tuck flap carton having four *rectangularly arranged and* joined walls, side flaps *at one end of the carton* extending from *the ends of* two of the opposite walls [at opposite ends thereof], an end closure panel *at the same end of the carton* extending from the [ends] *end* of one of [said other walls] *the other of said walls* and a tuck flap extending from the [ends] *free end* of said end closure [panels] *panel*, a step-by-step driven conveyer having pockets adapted to receive cartons in expanded tubular form and with said side flaps assuming a vertical position, apparatus for closing the cartons comprising means for folding inwardly said side flaps, movable tuck flap breaker means for folding the tuck flap inwardly against said end closure panel, creasing means for further creasing the fold made by said breaker means, a plow for engaging said end closure panel and camming it toward closed position, and coacting movable tuck flap aligning means and movable tucking means for closing said end panel and inserting said tuck flap between the side flaps and the adjacent carton wall.

2. In a packaging machine adapted to package articles in an expanded tuck flap carton having four *rectangularly arranged and* joined walls, side flaps *at one end of the carton* extending from *the ends of* two of the opposite walls [at opposite ends thereof], an end closure panel *at the same end of the carton* extending from the [ends] *end* of one of [said other walls] *the other of said walls* and a tuck flap extending from the [ends] *free end* of said end closure [panels] *panel*, a step-by-step driven conveyor having pockets adapted to receive cartons in expanded tubular form and with said side flaps assuming a vertical position, apparatus for closing the cartons comprising a plow arranged to fold in the leading side flap, movable folder for folding in the trailing side flap, movable tuck flap breaker means for folding the tuck flap inwardly against said end closure panel, creasing means for further creasing the fold made by said breaker means, a plow for engaging said end closure panel and camming it toward closed position, movable tucker means for engaging said end panel and closing same, and mo le tuck flap aligning means aligning the tuck flap for ıertion between the side flaps and adjacent carton wall.

3. In a packaging machine adapted to package articles an expanded tuck flap carton having four *rectangu-ly arranged and* joined walls, side flaps *at one end of* ? *carton* extending from *the ends of* two of the opposed lls [at opposite ends thereof], an end closure panel *the same end of the carton* extending from the [ends] d of one of [said other walls] *the other of said walls,* d a tuck flap extending from the [ends] *free end* of d end closure [panels] *panel,* a step-by-step driven ıveyer having pockets adapted to receive cartons in ɔanded tubular form and with said side flaps assuming 'ertical position, apparatus for closing the cartons com-sing a plow arranged to fold in the leading side flap, ıovable folder for folding in the trailing side flap, mov-e tuck flap breaker means for folding the tuck flap ɪardly against said end closure panel, creasing means further creasing the fold made by said breaker means, low for engaging said end closure panel and camming oward closed position, movable tucker means for en-ging said end panel and closing same, and movable k flap aligning means aligning the tuck flap for in-tion between the side flaps and adjacent carton wall, l means for operating said tucker means and said tuck ) aligning plate in coaction.

ɩ. In a packaging machine adapted to package articles an expanded tuck flap carton having four *rectangu-y arranged and* joined walls, side flaps *at one end of carton* extending from *the ends of* two of the opposed ls [at opposite ends thereof], an end closure panel *he same end of the carton* extending from the [ends] of one of [said other walls] *the other of said walls,* a tuck flap extending from the [ends] *free end* of l end closure [panels] *panel,* a step-by-step driven veyor having pockets adapted to receive cartons in anded tubular form and with said side flaps assuming ɜrtical position, apparatus for closing the cartons com-ing means for folding inwardly said side flaps, means holding said side flaps in closed position during move-ıt of said conveyer, movable tuck flap breaker means folding the tuck flap inwardly against said end closure el, creasing means for further creasing the fold made said breaker means, a plow for engaging said end ure panel and camming it toward closed position, coacting movable tuck flap aligning means and mov-: tucking means for closing said end panel and insert-said tuck flap between the side flaps and the adjacent on wall.

. In a packaging machine adapted to package articles ın expanded tuck flap carton having four *rectangu-ı arranged and* joined walls, side flaps *at one end of carton* extending from *the ends of* two of the opposed s [at opposite ends thereof], an end closure panel *ıe same end of the carton* extending from the [ends] of one of [said other walls] *the other of said walls,* a tuck flap extending from the [ends] *free end* of end closure [panels] *panel,* an endless conveyer ng pockets adapted to receive cartons in expanded ılar form with the side flaps vertically positioned, ns for driving the conveyer step-by-step to carry the ɔns through several successive stations, apparatus g said conveyer and at said stations for closing said cartons, said apparatus comprising means adjustably supported above said conveyer which engages the upper wall of each carton at one end and maintains each carton in expanded form within the pockets of the conveyer, movable tuck flap breaker means for folding the tuck flap inwardly against said end closure panel at one station while the conveyer rests, creasing means for further creasing the fold made by said breaker means for folding the tuck flap inwardly against said end closure panel, means for engaging said end closure flap toward closed position as the conveyer advances to a successive station, and coacting movable tuck flap aligning means and movable tucking means at the next successive station operating while the conveyer rests for closing said end panel and inserting said tuck flap between the side flaps and the adjacent carton wall.

6. In a packaging machine adapted to package articles in an expanded tuck flap carton having four *rectangularly arranged and* joined walls, side flaps *at one end of the carton* extending from *the ends of* two of the opposed walls [at opposite ends thereof], an end closure panel *at the same end of the carton* extending from the [ends] *end* of one of [said other walls] *the other of said walls,* and a tuck flap extending from the [ends] *free end* of said end closure [panels] *panel,* an endless conveyer having pockets adapted to receive cartons in expanded tubular form with the side flaps vertically positioned, means for driving the conveyer step-by-step to carry the cartons through several successive stations, apparatus along said conveyer and at said stations for closing said cartons, said apparatus comprising means adjustably supported above said conveyer which engages the upper wall of each carton at one end and maintains each carton in expanded form within the pockets of the conveyer, tuck flap breaker means for folding the tuck flap inwardly against said end closure panel at one station while the conveyer rests, said tuck flap breaker means including a stationary breaker bar and a movable breaking bar which folds the tuck flap over said *stationary* breaker bar when the conveyer is at rest, said *stationary* breaker bar extending at least partially into the area of the next successive station, creasing means for further creasing the fold made by said breaker means for folding the tuck flap inwardly against said end closure panel, said creasing means including a roller which is arranged to coact with said *stationary* breaker bar, means for engaging said end closure flap toward closed position as the conveyer advances to a successive station, and coacting movable tuck flap aligning means and movable tucking means at the next successive station operating while the conveyer rests for closing said end panel and inserting said tuck flap between the side flaps and the adjacent carton wall.

References Cited in the file of this patent or the original patent

UNITED STATES PATENTS

| | | |
|---|---|---|
| 1,337,404 | Jones | Apr. 20, 1920 |
| 1,621,516 | Milmoe | Mar. 22, 1927 |
| 2,116,607 | Milmoe | May 10, 1938 |
| 2,340,835 | Molhiot | Feb. 1, 1944 |
| 2,441,372 | Quigley et al. | May 11, 1948 |
| 2,662,355 | Ross | Dec. 15, 1953 |
| 2,682,210 | Bivans | June 29, 1954 |